United States Patent
Gervasi et al.

(10) Patent No.: US 12,127,655 B2
(45) Date of Patent: Oct. 29, 2024

(54) MARINATION CONTAINER FOR HARD-BOILED EGGS

(71) Applicants: Vito Gervasi, Pewaukee, WI (US); Kiyami Masamune, Altoona, PA (US)

(72) Inventors: Vito Gervasi, Pewaukee, WI (US); Kiyami Masamune, Altoona, PA (US)

( * ) Notice: Subject to any disclaimer, the term of this patent is extended or adjusted under 35 U.S.C. 154(b) by 1575 days.

(21) Appl. No.: 16/214,652

(22) Filed: Dec. 10, 2018

(65) Prior Publication Data
US 2019/0174946 A1    Jun. 13, 2019

Related U.S. Application Data

(60) Provisional application No. 62/597,393, filed on Dec. 11, 2017.

(51) Int. Cl.
*A47J 29/06*    (2006.01)
*A45D 19/00*    (2006.01)
*A47G 19/28*    (2006.01)
*B65D 85/32*    (2006.01)

(52) U.S. Cl.
CPC ............ *A45D 19/012* (2021.01); *A45D 19/00* (2013.01); *A45D 19/0066* (2021.01); *A47G 19/28* (2013.01); *B65D 85/32* (2013.01)

(58) Field of Classification Search
CPC ....... A47J 29/06; A45D 19/012; A45D 19/00; A45D 19/0066; A47G 19/28; B65D 85/32
See application file for complete search history.

(56) References Cited

U.S. PATENT DOCUMENTS

| | | | | |
|---|---|---|---|---|
| 2,998,896 A | * | 9/1961 | Miller | B65D 11/02 |
| | | | | 312/351 |
| 2016/0331163 A1 | * | 11/2016 | Handerhan | A47G 19/10 |
| 2018/0290816 A1 | * | 10/2018 | Elkordy | B65D 83/0055 |
| 2019/0008298 A1 | * | 1/2019 | Gifford | A47G 19/28 |

* cited by examiner

*Primary Examiner* — Dana Ross
*Assistant Examiner* — Kuangyue Chen
(74) *Attorney, Agent, or Firm* — Boyle Fredrickson, S.C.

(57) ABSTRACT

A flexible egg conforming container receives an egg therein and provides channels around the egg to marinate the egg with reduced marinade. The channels are supported away from the egg by inwardly extending bosses arrayed to impart a decorative pattern to the egg after marination.

16 Claims, 3 Drawing Sheets

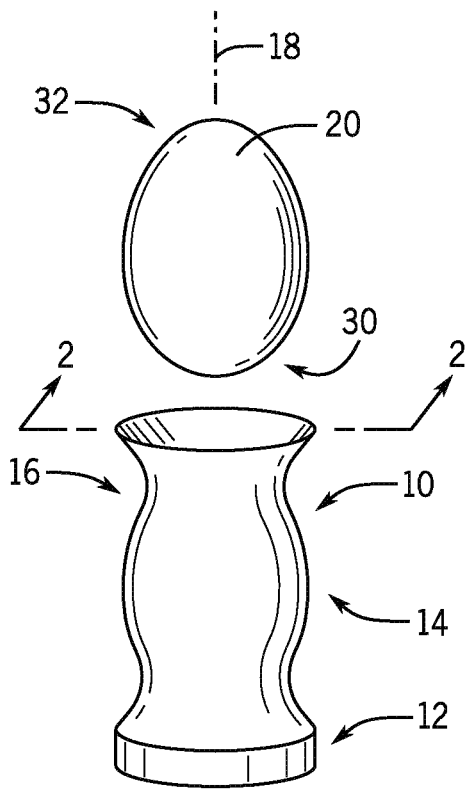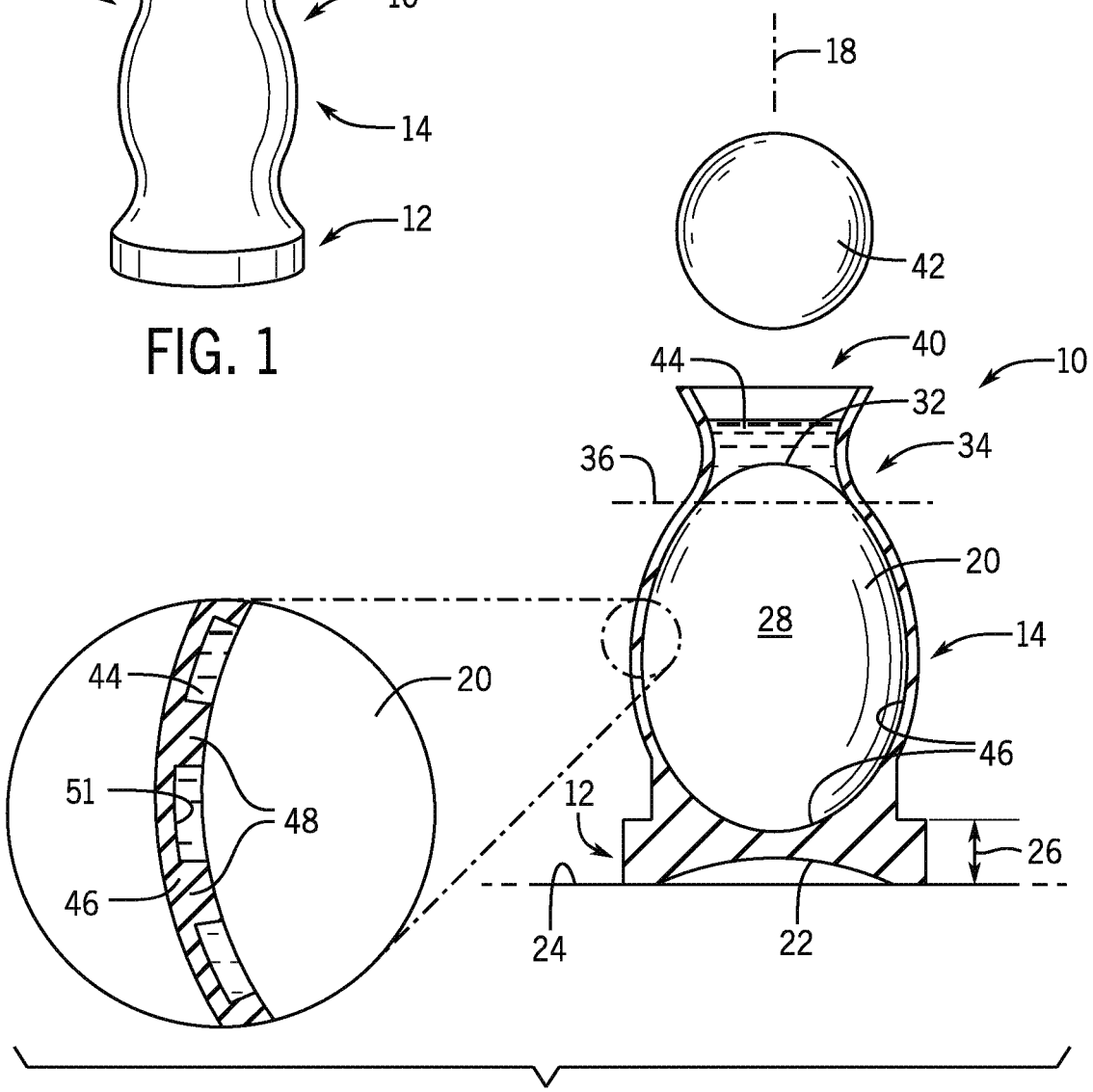

MARINATION CONTAINER FOR HARD-BOILED EGGS

CROSS REFERENCE TO RELATED APPLICATION

This application claims the benefit of U.S. Provisional Applications 62/597,393 filed Dec. 11, 2017.

STATEMENT REGARDING FEDERALLY SPONSORED RESEARCH OR DEVELOPMENT

Background of the Invention

The present invention relates to cooking utensils and in particular an efficientcontainer for preparing marinated hard-boiled eggs and producing a decorative pattern during the marinating process.

Hard-boiled eggs, removed from the shell, are often marinated in a seasoning such as soy sauce which imparts an attractive color and flavor to the egg. Most simply this can be done by filling a small container with a liquid marinade 44 and immersing the eggs within that container. Substantial marinade 44 is normally required to fully cover the eggs and to fill the spaces between them when multiple eggs are being prepared at one time. After the marination is complete, this extra marinade 44 must normally be discarded producing substantial waste.

SUMMARY OF THE INVENTION

The present invention provides a conforming container that allows marination of a hard-boiled egg with a reduced volume of marinade 44. The walls of the container may be spaced from the outer surface of the egg (allowing the flow of marinade 44) by means of inwardly extending bosses arranged to produce a decorative pattern on the outer surface of the egg.

These particular objects and advantages may apply to only some embodiments falling within the claims and thus do not define the scope of the invention.

BRIEF DESCRIPTION OF THE DRAWINGS

FIG. 1 is a perspective view of the container of the present invention positioned beneath a hard-boiled egg with the shell removed prior to insertion of the egg into the container;

FIG. 2 is a cross-sectional view along line 2-2 of FIG. 1 with the egg fully received within the container and showing in inset bosses which space the elastic conforming container walls away from the egg surface permitting flow of marinade 44;

DETAILED DESCRIPTION OF THE PREFERRED EMBODIMENT

Marination Container for Hard-Boiled Eggs

Figure 3:
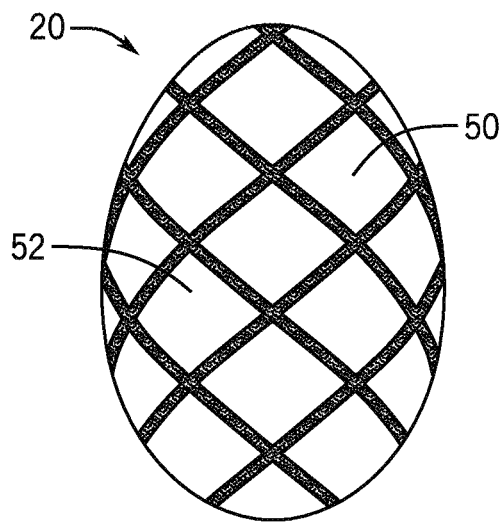
FIGS. 3-5 are elevational views of eggs after treatment with marinade 44 with various patterns of bosses including tessellated diamonds, spirals, and hearts.

Referring now to FIG. 1, a marination container 10 per the present invention may provide for a base end 12 having a lower surface for stably supporting the container 10 in an upright position on a horizontal surface.

Positioned vertically above the base end 12 is a cavity region 14 which communicates with an open end 16 positioned immediately thereabove such that the open end 16 is centered above the base end 12 along a vertical axis 18. During use, a hard-boiled egg 20 with the shell removed and having an axis of symmetry aligned with the vertical axis 18 may be inserted through the open end 16 into the cavity region 14 to be supported in that orientation by the container 10 stabilized by the base end 12.

In one embodiment, the base end 12 cavity region 14 and open end 16 are molded as an integral unit from silicone rubber and elastomeric polymer.

Referring now also to FIG. 2, a lower surface 22 of the base end 12 as supported against a table top 24 or the like may have a vertical thickness 26 along the vertical axis 18 of five millimeters or more of solid silicone rubber to provide additional weight and stability. The lower surface 22 may be upwardly, slightly concave to provide a suction cup effect helping to stabilize the container on a smooth surface or the like.

An upper surface of the base end 12 forms a lower inner wall of an ovoid cavity 28 of the cavity region 14, the lower inner wall sized to conform to a blunt end 30 of the egg 20 as distinguished from a pointed end 32 of the egg 20. Sidewalls of the ovoid cavity 28 proceed upward from the base end 12 to a neck region 34 at a neck height 36. A thickness of these walls may be less than three millimeters. In a relaxed state, the ovoid cavity 28 of the cavity region 14 may closely conform to at least 80 percent of the surface of the egg such that an inner cavity wall is within four millimeters of the surface of a grade large egg per USDA standards.

At the neck region 34, at the neck height 36, the walls of the container may diverge from the outer surface of the received egg 20 and a diameter of the container may expand to provide a funnel 40 to assist in receiving the egg 20 into the ovoid cavity 28 and to assist in receiving a liquid marinade 44 such as soy sauce. The egg 20 may be inserted through this neck region 34 by a slight elastic expansion of the material of the container 10.

A stopper 42, for example, a light weight spherical polymer ball or specially molded plug/cover (not shown) may be provided to set in the funnel 40 to seal the marinade 44 against evaporative action of a marinade 44 within the container 10 and to be supported by the walls of the funnel 40 above the received egg 20. When a special plug is used, a lower surface of the plug may contact the egg 20 and may provide a boss for imprinting the egg as will be discussed below.

Referring still to FIG. 2, an inner surface of the cavity walls 46 may provide for inwardly extending bosses 48 that elastically press against the outer surface of the received egg 20 to support an inner surface of remaining portions of the cavity walls 46 away from the egg surface to allow marinade 44 to flow therein. In one embodiment, bosses 48 may have an inward extension of more than one millimeter or less than five millimeters. Spaces between the bosses 48 preferably provide continuous channels 51 communicating with the neck region 34 and funnel 40 to receive marinade 44 therethrough; however, disconnected channels 51 may also work through a massaging of walls of the container 10 (possible because of its flexible nature) once the received egg 20 is in place in the ovoid cavity 28.

In one embodiment, the channels 51 may be completely filled with less than one tablespoon of marinade 44 when the received egg 20 is in place within the cavity and the marinade 44 fully covers the pointed end 32 of the egg.

Figure 4:
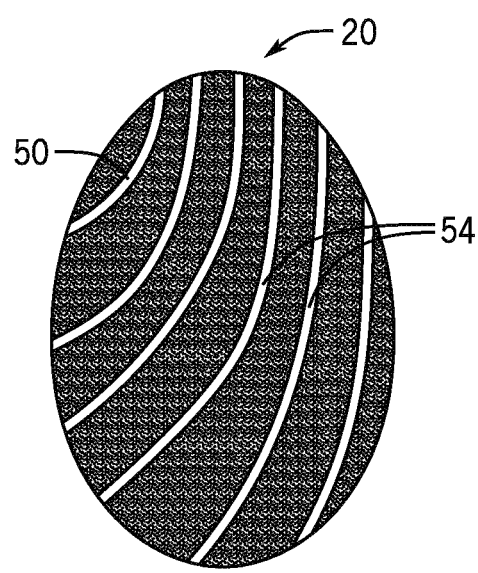
Figure 5:
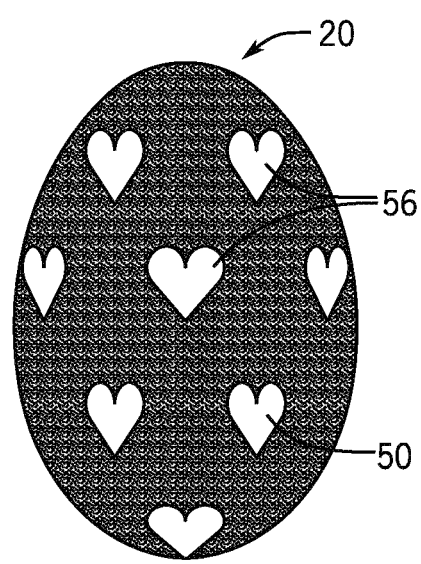

Referring now to FIGS. 3, 4, 5, the bosses 48 may provide for regions 50 of marinade 44 exclusion forming lines or patterns on the eggs 20 after the eggs 20 have marinated and have been removed from the container 10. Portions of the egg 20 between the regions 50 of the marinade 44 will be dyed by the marinade 44, and the regions 50 will be lighter having been excluded from the marinade making contact with the egg 20. Various patterns are possible including, for example, tessellated or tiled shapes such as diamonds 52, as well as lines or spirals 54 or isolated polka dot patterns 56, for example, of hearts or the like. Ideally pattern exclusion regions 50 occupy less than 15 percent of the surface of the egg after marination to provide for sufficient seasoning of the egg.

The container 10 may be easily inverted (turned inside out) so that its inner surface is exposed outwardly for ready cleaning and the like.

Figure 6:
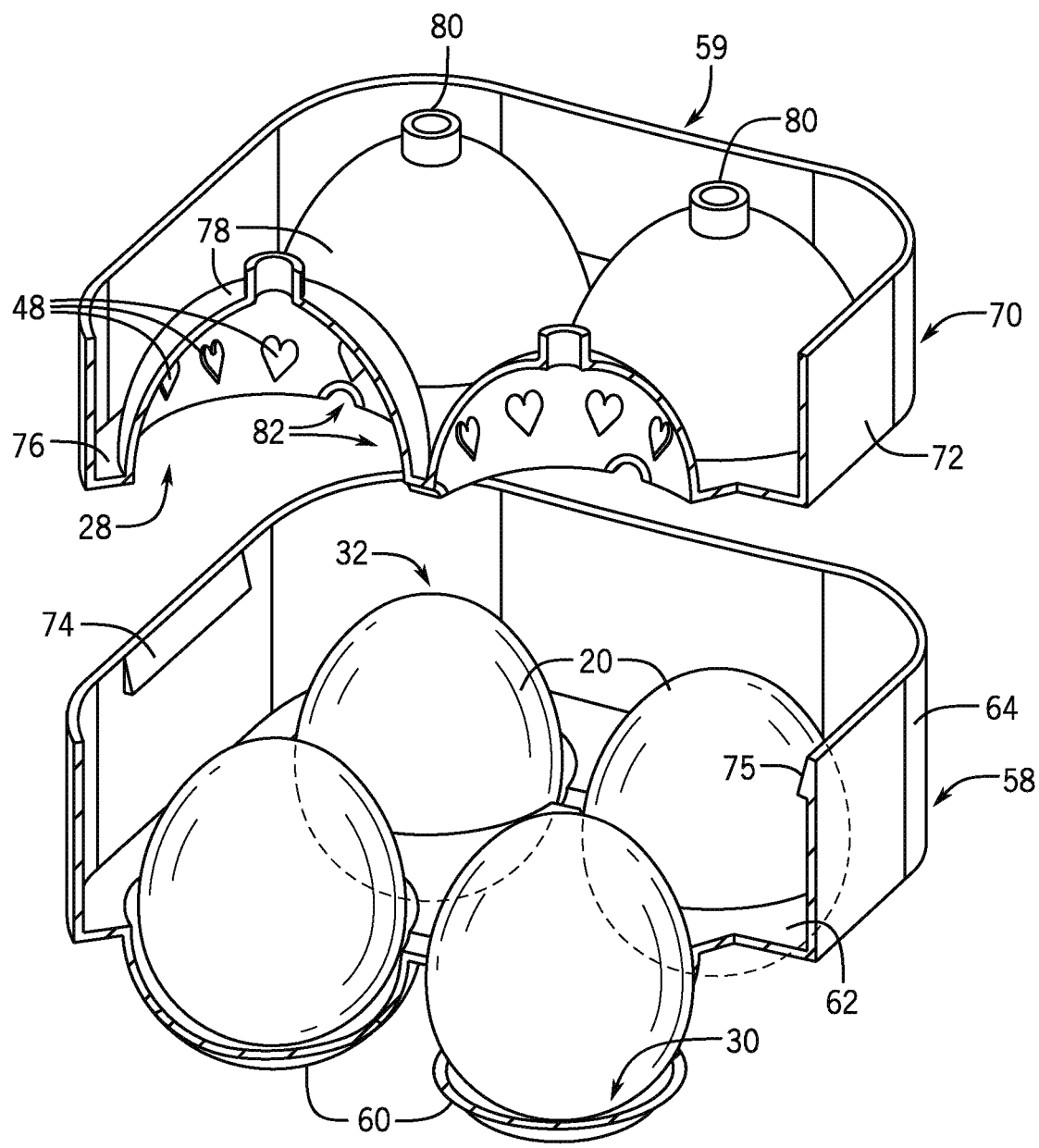
FIG. 6 is a figure of an alternative embodiment in partial cross-section for providing marination of multiple eggs at one time.

Referring now to FIG. 6, in an alternative embodiment, multiple hard-boiled eggs 20 with their shells removed may be treated at one time using a two-part container 59 having an interengaging lower tray 58 and upper tray portion 70. The lower tray 58 provides a set of lower pockets 60 sized to cradle and closely conform to the blunt end 30 of corresponding eggs 20. These pockets 60 are arrayed along a lower planar surface 62 of the lower tray 58. The lower planar surface 62 of the lower tray 58 is in turn surrounded by upstanding peripheral sidewalls 64 having a height greater then the height of the eggs 20 when received in the pocket 60.

The upper tray 70 also provides upstanding sidewalls 72 size to be received within the sidewalls 65 and to slide with their outer surfaces closely along the inner surfaces of the sidewalls 64 of the lower tray 58. When the upper tray 70 is fully installed within lower tray 58, it may be releasably held in place in the lower tray 58 by a tooth catch element 74 extending inward from the upper edge of the sidewalls 64. This tooth element 74 elastically captures the upper edge of sidewalls 72 preventing removal of the upper tray 70 without disengaging of the tooth element by flexing outward of the outer sidewalls 64.

Spanning the lower edge of sidewalls 72 is a planar bottom surface 76 having upwardly extending pockets 78 that can cradle and closely conform to the pointed end 32 of the eggs 20 when the planar wall 76 abuts the sidewall 72 with the upper tray 70 fully installed in the lower tray 58. Together, the pockets 78 and corresponding pockets 60 form multiple ovoid cavities 28 operating as described in the previous embodiment. In this regard, the inner surfaces of the pockets 78 and 60 provide inwardly extending bosses 48 that serve to exclude marinade from the surface of the eggs 20 to create the patterns described with respect to FIGS. 3-5 when marinade flows around the bosses 48.

The upper ends of the pocket 78 may provide for filling ports 80 that may receive the marinade into the cavities 28 and each of the pocket 78 may have laterally extending channels 82 (meeting with corresponding channels in the upper surface of the planar surface 62 not visible in FIG. 6) leading to other pocket 78 to allow equalization of marinade in between the cavities 28. The filling ports 80 may be flared to provide a funnel shape for receiving soy sauce or the like or may fit with a separate funnel element not shown.

The lower tray 58 and upper tray 70 need not seal against leakage of the marinade because they provide therebetween only a small space volume outside of the cavities 28 which may be filled with a small volume of marinade up to the height of the cavities 28.

The material of the lower tray 58 and upper tray 70 may be any flexible thermoplastic material such as polyethylene or the like or may be selected from materials as described above with respect to the first embodiment providing elasticity for better conforming to the eggs 20. It will be appreciated that this general design showing space for four eggs can be increased or decreased to any arbitrary number. Caps may be provided (not shown) that fit over the filling ports 80 when not in use.

Single-Strand Hair Dying System

A second present invention relates to hair dying and in to particular an apparatus for applying hair dye to human hair.

Hair color changes naturally as people age, eventually turning gray or white. This process is not uniform, however, with some hairs turning white more than a decade before adjacent hairs.

Dealing with occasional white hairs is difficult. While a wide variety of hair dyes and applicators exist, the process of hair dying is cumbersome and costly especially for a single hair.

SUMMARY OF THE INVENTION

The present invention provides a hair dye applicator adapted for dying a single hair. By limiting the dye application to a single hair, the dying process can be quick with little mess. The applicator can be reused many times over an extended period and easily carried with an individual for occasional use.

BRIEF DESCRIPTION OF THE FIGURES

FIG. 7 is a perspective view of an individual holding the applicator of the present invention for drawing the applicator along a single hair to be dyed;

FIG. 8 is an exploded fragmentary perspective view of the applicator including a felt tip style dye dispenser coupled to a guide probe for capturing and guiding a single hair through the applicator;

FIG. 9 is a perspective view similar to FIG. 8 showing a cover fitting over the guide probes to permit reuse of the applicator at a later time; and FIG. 10 is an exploded detail view of FIG. 8 showing a barbed slot system used for retaining a hair within the applicator in contact with a dye tip.

DETAILED DESCRIPTION OF THE PREFERRED EMBODIMENT

Referring now to FIG. 7, a single-hair, dye applicator 110 of the present invention may provide for a pen type cylindrical handle 112 extending along axis 115 easily grasped by a user's hand 114 in the manner of a paintbrush or the like. A distal end of the handle 112 supports a guide probe assembly 116 having flexible fingers 118 extending distally therefrom and separated by a gap 120 to allow capture and retention of a single human hair 124 therebetween. Once the hair is captured, the hair dye applicator 110 may be moved toward the root of the hair 124 and then drawn down along the hair 124 to dye the hair 124 as will be described below.

Referring now also to FIG. 8, the handle 112 may provide an internal reservoir 128 holding a hair dye material (either permanent or semi permanent) conducted by capillary action to a distally extending fibrous tip 130 in the manner of conventional ink markers (often called felt tip markers). The fiberous tip 130 may be generally cylindrical about axis 115 terminating distally at a conical section 132 leading to a distal apex. A V-shaped slot 134 having its widest portion toward the distal apex may be cut in the tip 130 to receive a hair along axis 115 therein allowing the tip 130 to conduct ink on multiple sides of the hair simultaneously as the hair is pulled through the V-slot 134. Desirably the V-shaped slot 134 has an angle of less than 120 degrees and desirably less than 10 degrees or five degrees.

A cylindrical collar 136 being an extension of the handle 112 but of smaller diameter is aligned with axis 115 to coaxially surround the tip 130 at its proximal end providing support for the tip 130. This collar 136 may receive by press fit a sleeve 140 of the guide probe assembly 116 having a like sized internal bore 142. The sleeve 140 may be attached to the collar 136 by press fit, adhesive, ultrasonic welding or the like. The bore 142 provides a space for receiving not only the collar 136 but also the tip 130 which may extend distally into a neck region 144 of the guide probe assembly 116. The neck region 144 may have a through bore 146 perpendicular to axis 115 and exposing the proximal end of the V-slot 134 therethrough. In this way a hair 124 may pass through the bore 146 to be received within the slot 134 and drawn perpendicularly to axis 115 for dying. The bore 142 may be, for example, of small diameter less than three millimeters so that the tip 130 is otherwise surrounded by protective material of the neck region 144 preventing direct contact between the tip 130 and a planar surface such as the skin.

Referring also to FIG. 10, an upper periphery of the bore 146 is broken by guide slot 148 parting about a plane parallel to the axis 115 and extending perpendicularly thereto. The guide slot 148, for example, may have a narrow distally opening V-shape and a width of one millimeter or less. Opposed inner surfaces of the guide slot 148 may provide for inwardly extending and opposed barbs or stepped regions 149 that can operate to retain a hair 124 within the guide slot 148 against removal from the guide slot 148 upward along the axis 115. A hair 124 may pass along this guide slot 138 into the bore 146 to be received by the tip 130 when the guide probe assembly 116 is in place on the handle 112.

Extending on either side of the guide slot 138 are long, flexible, distally extending fingers 118, for example, having a length along axis 115 of two centimeters or more or at least one centimeter. The guide fingers 118 leave the neck region 144 at an angle of less than 30 degrees and more than 15 degrees therebetween and then curve back toward the axis 115 at their distal tips. In this way, the guide fingers 118 can be used to hook and guide an individual hair 124 into the slot 148 while providing for natural flexure to bow predictably if they are inadvertently jammed against the individual skin or the like. For similar reasons, the distal tips of the fingers 118 may be rounded or may include protective balls 119 or the like.

The fingers 118 generally narrow from their distal to their proximal ends and at their distal tips may have a width of one millimeter or less to assist in their use to separate an individual hair from other closely proximate hairs and to provide substantial flexibility.

Referring also to FIG. 9, desirably the fingers 118 may be elastically flexed, for example, so that their widest separation in a relaxed state of greater than one centimeter and desirably greater than 1.5 centimeters or the like may be reduced 150 percent without fracture and with only light finger pressure. In this way an airtight cylindrical cover 150, for example, having an internal diameter equal to the diameter of the handle 112 below the collar 136 can be placed over the handle 112 by flexing inward of the fingers 118 to provide an airtight seal against the outer surface of the handle 112 preventing evaporation of the dye 131 material from the tip 130 during prolonged storage.

The material of the guide probe assembly 116 and the handle 112 is desirably a polymer material, for example, polypropylene or polyethylene. The dye 131 may be of any hair color or other color and may be scented. Ideally the dye is fast drying, for example, using a volatile solvent or the like.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference, which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A marination container for a single hard-boiled egg comprising:
    a container sized and having an open state to receive only the single hard boiled egg therein, the container further having a closed state providing an ovoid cavity into which the single hard-boiled egg is received, the container having walls providing a set of multiple spaced and separated and inwardly extending bosses pressing against an outer surface of the single hard-boiled egg as received and adapted and cooperating with the ovoid cavity to support the single hard-boiled egg in a fixed position with respect to the bosses with a surface of the single hard-boiled egg spaced away from portions of the walls between multiple of the bosses, the portions spaced away from the outer surface of the single hard-boiled egg as received to allow passage of marinade introduced into an opening in first end of the container in the closed state and around the single hard-boiled egg as received to be retained in the container to marinate the single hard-boiled egg as received by flowing around the bosses to all the portions spaced away from the outer surface of the single hard-boiled egg as received while being blocked from flowing between the bosses and portions of the egg supported by the bosses to impart a predetermined pattern on the surface of the single hard-boiled egg.

2. The marination container of claim 1 wherein the container is a flexible sleeve to receive the single hard-boiled egg therein through the opening, the flexible sleeve providing in a relaxed state providing an opening smaller than a smallest diameter of the single hard-boiled egg and the ovoid cavity into which the single hard-boiled egg is received.

3. The marination container of claim 2 wherein the flexible sleeve is formed of an elastic polymer.

4. The marination container of claim 3 wherein the elastic polymer is silicone rubber.

5. The marination container of claim 2 wherein in the ovoid cavity is radially symmetric about a vertical axis.

6. The marination container of claim 5 wherein the ovoid cavity conforms to the single hard-boiled egg having a blunt end downward.

7. The marination container of claim 2 wherein the bosses are a set of spiral ridges about an axis.

8. The marination container of claim 2 wherein the bosses provide a set of tessellated patterns over the surface of the single hard-boiled egg.

9. The marination container of claim 2 wherein the ovoid cavity when holding the single hard-boiled egg may be filled to cover the single hard-boiled egg with less than two tablespoons of liquid.

10. The marination container of claim 2 wherein in the ovoid cavity conforms to a size of a USDA large size egg.

11. The marination container of claim 2 wherein an inner surface of a wall of the sleeve is proximate to an outer surface of the single hard-boiled egg when the single hard-boiled egg is a grade large egg within three millimeters over 80 percent of a surface the grade large egg.

12. The marination container of claim 2 wherein the flexible sleeve provides a wall of less than three millimeters in thickness.

13. The marination container of claim 2 wherein the opening provides a funnel portion having an open lip communicating to the ovoid cavity through a reduced diameter neck section smaller in diameter than the open lip.

14. The marination container of claim 2 wherein the flexible sleeve has a second end providing a base for supporting the marination container on a horizontal surface with the first end vertically above the second end.

15. The marination container of claim 14 wherein the second end is upwardly concave to provide a suction cup surface adhering the second end to a smooth horizontal surface.

16. The marination container of claim 1 wherein the container provides an upper and lower tray each having tray surfaces providing partial ovoid cavities that fit together to form the ovoid cavity when the tray surfaces abut, the upper and lower tray having upwardly extending peripheral walls around respective tray surfaces with the upwardly extending peripheral walls of the upper tray fitting within the upwardly extending peripheral walls of the lower tray when the tray surfaces abut.

* * * * *